Jan. 6, 1959     L. F. DE KEYSER ET AL     2,867,542
GELATIN ADHESIVE LAYERS
Filed May 24, 1955

FIG. 1
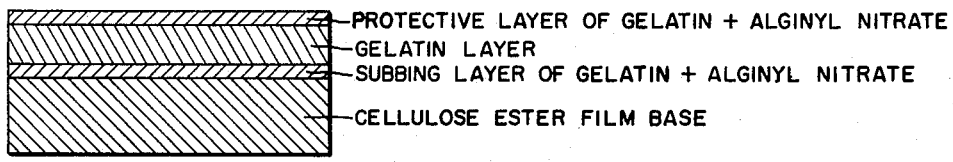
— PROTECTIVE LAYER OF GELATIN + ALGINYL NITRATE
— GELATIN LAYER
— SUBBING LAYER OF GELATIN + ALGINYL NITRATE
— CELLULOSE ESTER FILM BASE FIG. 2
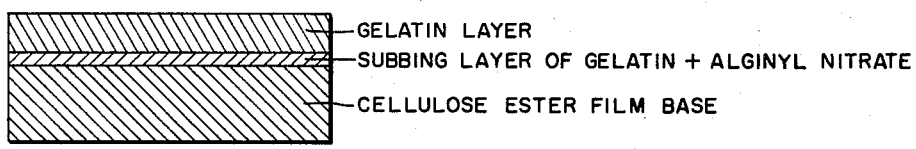
— GELATIN LAYER
— SUBBING LAYER OF GELATIN + ALGINYL NITRATE
— CELLULOSE ESTER FILM BASE FIG. 3
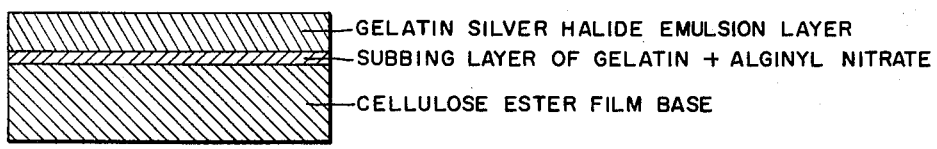
— GELATIN SILVER HALIDE EMULSION LAYER
— SUBBING LAYER OF GELATIN + ALGINYL NITRATE
— CELLULOSE ESTER FILM BASE FIG. 4
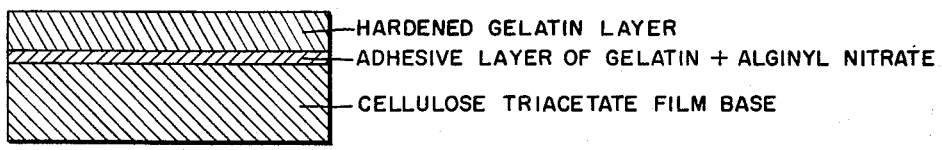
— HARDENED GELATIN LAYER
— ADHESIVE LAYER OF GELATIN + ALGINYL NITRATE
— CELLULOSE TRIACETATE FILM BASE FIG. 5
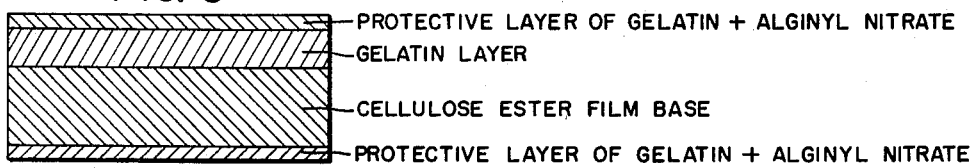
— PROTECTIVE LAYER OF GELATIN + ALGINYL NITRATE
— GELATIN LAYER
— CELLULOSE ESTER FILM BASE
— PROTECTIVE LAYER OF GELATIN + ALGINYL NITRATE FIG. 6
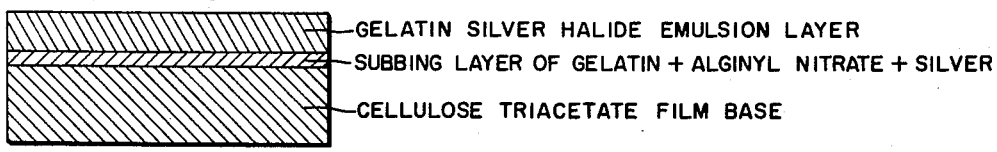
— GELATIN SILVER HALIDE EMULSION LAYER
— SUBBING LAYER OF GELATIN + ALGINYL NITRATE + SILVER
— CELLULOSE TRIACETATE FILM BASE

INVENTORS
LODEWIJK FELIX DE KEYSER
LODEWIJK AUGUST VAN DESSEL
BY

United States Patent Office 2,867,542
Patented Jan. 6, 1959

2,867,542
GELATIN ADHESIVE LAYERS

Lodewijk Felix De Keyser, Mortsel-Antwerp, and Lodewijk August Van Dessel, Wilrijk-Antwerp, Belgium, assignors to Gevaert Photo-Producten N. V., Mortsel-Antwerp, Belgium, a Belgian company Application May 24, 1955, Serial No. 510,844

Claims priority, application Belgium May 26, 1954

4 Claims. (Cl. 117—34)

This invention relates to the use of alginyl nitrate in gelatin-containing adhesive layers.

It is generally known difficult to make hydrophilic layers adhere, for instance, gelatin to hydrophobic layers such as cellulose ester films.

Suspensions containing hydrophilic and hydrophobic substances were applied as an intermediate layer in order to make layers with opposite properties adhere to each other.

Preparing suitable and stable suspensions as well as coating these suspensions onto a clear adhesive layer often causes great difficulties.

It is an object of this invention to unite firmly hydrophilic and hydrophobic layers.

Another object of this invention is to protect a hydrophilic as well as a hydrophobic surface by means of the same strongly adhesive composition.

A further object of this invention is a method to protect in one operation shaped articles possessing hydrophilic and hydrophobic surfaces. Other objects will appear from the following description.

Now we have found that a mixture of gelatin and alginyl nitrate forms layers which possess a great adhesive power with respect to hydrophilic as well as hydrophobic surfaces.

Adhesive layers which are waterproof and remain intact in an alkaline medium may be coated with mixtures in which the proportion of alginic acid derivatives and gelatin is between 1/9 and 1/1.

The alginyl nitrate is obtained in a very simple way by causing fuming nitric acid to react upon alginic acid or metal alginate such as sodium alginate. Similarly nitric acid from a former nitration may be used with a desired quantity of fresh fuming nitric acid as esterifying liquid, whereby better substituted alginic acid derivatives are obtained. As starting material, low esterified alginic acid such as alginyl acetate with ±0.5 ester groups per mannuronic acid unit may likewise be used. Hereby mixed esters are obtained which possess the same good properties as pure alginyl nitrate. Depending on the condition of reaction and the starting materials, the substitution may so controlled that only part of or practically both hydroxyl groups per mannuronic acid unit in the alginic acid molecule may be replaced by nitrate groups.

More complete esterification of the carboxyl group with for instance ethylene oxides gives more stable alginyl nitrates which at the same time are more insensitive to alkaline baths.

The adhesive layers according to the present invention are particularly suited as substratum layers in photographic material or for building up a multi-layer material which contains superposed hydrophilic and hydrophobic layers and is exposed to humid atmosphere or aqueous solutions.

The alginyl nitrates which are to be considered according to this invention possess 0.5 to 1.5 nitro groups per mannuronic acid unit. Contrary to the pure alginyl nitrate layers, their mixtures do not dissolve with gelatin in alkaline baths. Thus, they may be used either as permanent protective layer upon hydrophilic and upon hydrophobic surfaces, or as adhesive layer between both surfaces.

The specification is accompanied by a drawing in which by way of example six different diagrammatic representations of photographic multilayer material according to our invention are shown. Each of the six views is accompanied by a legend.

Hereinafter follow some examples of gelatin-alginyl nitrate mixtures and their application, which examples are only intended to illustrate the invention without limiting same.

Example 1

| | | |
|---|---|---|
| Gelatin | parts of weight | 0.7 |
| Alginyl nitrate hydroxy ethyl ester | do | 0.3 |
| Ethylene chlorohydrine | parts of volume | 30 |
| Ethanol | do | 40 |
| Acetone | do | 8 |
| Water | do | 22 |
| Trichloro acetic acid 5% | do | 4 |

After drying, this solution forms a layer well adhering to cellulose triacetate or to gelatin layers hardened with chrome alum. Such layer may be used, for instance, in light-filters as adhesive layer between the colored hardened gelatin layer and the cellulose-triacetate support.

Example 2

| | | |
|---|---|---|
| Gelatin | parts of weight | 0.8 |
| Alginyl nitrate | do | 0.2 |
| Ethylene chlorohydrine | parts of volume | 30 |
| Acetone | do | 8 |
| Ethanol | do | 40 |
| Water | do | 22 |
| Hydrogen chloride (concentrated) | part of weight | 0.1 |

This solution gives a layer well adhering to gelatin, cellulose aceto butyrate or cellulose tracetate, either saponified or not. It may be applied as bilateral covering layer on a cellulose acetobutyrate film which at one side bears a gelatin layer. This coating may be done in one step by drawing the gelatin-coated film through the solution.

Example 3

| | | |
|---|---|---|
| Gelatin | parts of weight | 0.8 |
| Alginyl nitrate | do | 0.2 |
| Ethanol | parts of volume | 52 |
| Glycol diacetate | do | 5 |
| Methylene chloride | do | 20 |
| Ethylene chloro hydrine | do | 6 |
| Acetone | do | 1.6 |
| Water | do | 20 |
| Hydrogen chloride (concentrated) | do | 0.1 |

When adding to this solution finely divided silver, it may be coated as a dark antihalation layer. The solution may directly be applied to the saponified cellulose triacetate film support and other hydrophilic layers may be coated to the gelatin layer containing alginic acid, so that the layers mutually adhere very well and resist to treatment in water.

We claim:

1. A multilayer material including at least one layer consisting essentially of cellulose ester of lower fatty acids, at least one layer of gelatin, and at least one layer consisting essentially of a mixture of 90 to 10 parts by weight of gelatin and 10 to 90 parts by weight of alginyl nitrate, the last named layer uniting the first and second named layers.

2. A multilayer material including a gelatin layer, a cellulose ester film, and a layer consisting essentially of a mixture of 90 to 10 parts by weight of gelatin and 10 to 90 parts by weight of alginyl nitrate, the last named layer uniting the first named layer and the film.

3. A multilayer material including a gelatin layer, a cellulose triacetic film, and a layer consisting essentially of a mixture of 90 to 10 parts by weight of gelatin and 10 to 90 parts by weight of alginyl nitrate, the last named layer uniting the first named layer and the film.

4. A photographic light-sensitive material including a gelatin silver halide emulsion layer, a film support of a cellulose ester of a lower fatty acid, and a layer consisting essentially of a mixture of 90 to 10 parts by weight of gelatin and 10 to 90 parts by weight of alginyl nitrate, the last named layer uniting the first named layer and the film support.

References Cited in the file of this patent

UNITED STATES PATENTS

| 2,476,240 | Famulener | July 12, 1949 |

FOREIGN PATENTS

| 519,733 | Belgium | May 30, 1953 |